No. 714,550. Patented Nov. 25, 1902.
B. YCRE.
MOLD FOR MAKING FRENCH ROLLS.
(Application filed Apr. 5, 1902.)
(No Model.)
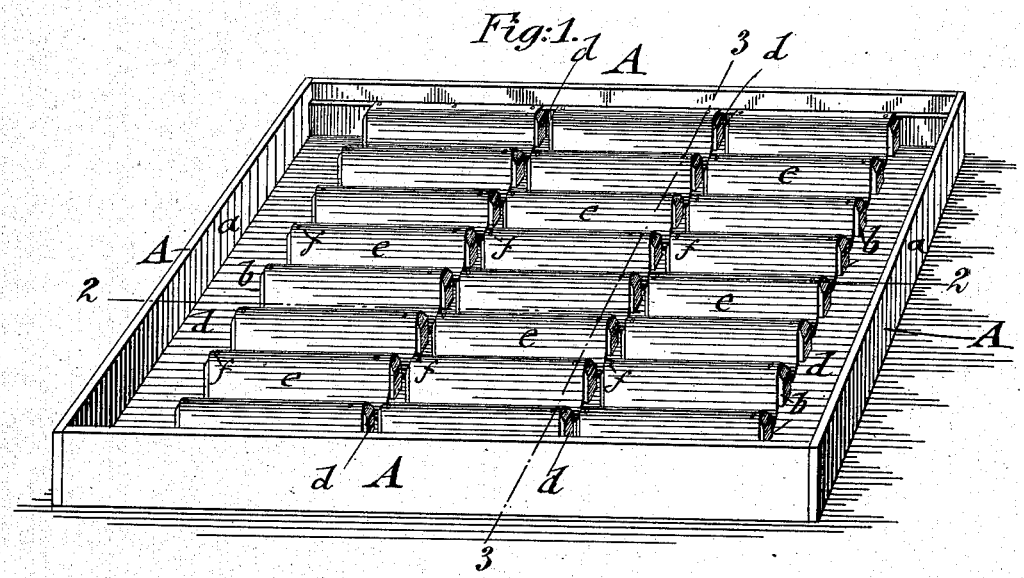
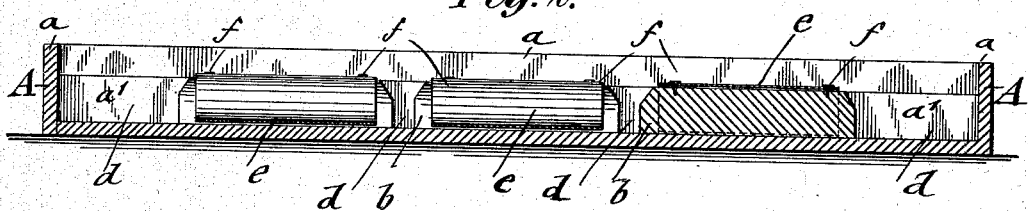
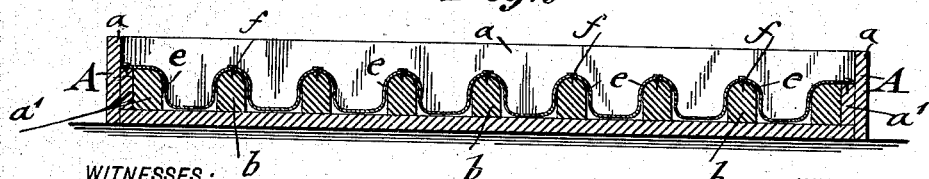
WITNESSES:
INVENTOR
Baptiste Ycre
BY
ATTORNEYS.

UNITED STATES PATENT OFFICE.

BAPTISTE YCRE, OF NEW YORK, N. Y.

MOLD FOR MAKING FRENCH ROLLS.

SPECIFICATION forming part of Letters Patent No. 714,550, dated November 25, 1902.

Application filed April 5, 1902. Serial No. 101,480. (No model.)

*To all whom it may concern:*

Be it known that I, BAPTISTE YCRE, a citizen of the Republic of France, residing in New York, borough of Manhattan, and State of New York, have invented certain new and useful Improvements in Molds for Making French Rolls, of which the following is a specification.

This invention relates to an improved mold for making French rolls, so that a larger quantity can be formed, trimmed, and made ready for baking in a given time; and for this purpose the invention consists of a mold for French rolls comprising a rectangular box provided with a number of rows of raised ribs attached to the bottom of the box and placed in such a manner that intervals are formed between the individual rows and the rows and side walls of the box, and aprons attached to the front and rear ends of the box and the ribs and extending over the ribs and into the spaces between the ribs, as will be fully described hereinafter and finally set forth in the claims.

In the accompanying drawings, Figure 1 is a perspective view of my improved mold for making French rolls. Figs. 2 and 3 are respectively a vertical transverse section and a vertical longitudinal section of the same on lines 2 2 and 3 3, Fig. 1.

Similar letters of reference indicate corresponding parts.

Referring to the drawings, A represents the box of my improved mold. The box is preferably made of rectangular shape and of any suitable size, according to the number of rolls to be made in the same. The box A is provided with raised side and end walls $a$ and with a number of longitudinal rows of raised and rounded-off ribs $b$, which are attached to the bottom of the box at such distances from each other that in each of the spaces between two ribs a quantity of dough may be placed of sufficient size for forming one roll. Between two adjacent rows of ribs $b$ and between the ends of the outer rows of ribs and the raised side walls of the box A are formed longitudinal intervals or spaces $d$, which serve for the purpose of permitting the entrance of a baker's cutting-knife, by which the longitudinally-stretched dough placed into the spaces between the ribs is cut into smaller pieces and trimmed at the ends. Over the ribs of each row extends an apron $e$, which is attached by nails $f$ to the top of the rounded-off ribs, as shown clearly in Figs. 2 and 3. The aprons extend loosely into the spaces between the ribs and are attached at their ends to cleats $a'$, that are formed at the inside of the end walls $a$ of the box A, as shown clearly in Figs. 1 and 3. The aprons are equal in width, or approximately so, with the upper ends of the ribs, so as not to project into the longitudinal spaces or intervals between the same.

When the rolls are to be made, the dough is rolled out to a sufficient length to fill up all the transverse spaces between the rows of ribs. It is then cut into as many pieces as there are rows of ribs by passing the knife to and fro in the longitudinal spaces between the rows of ribs. The knife is also passed along the rows of ribs in the end spaces, so as to trim the ends of the dough in the outer rows of ribs to uniform length. In this manner the pieces of rolled or stretched dough placed transversely in the spaces between the ribs are cut into equal pieces of uniform size, corresponding to the size of the rolls to be made. A peel that corresponds in size to the mold is placed in position over the same and the mold and peel reversed together, so that the mold is placed in inverted position on the peel and drops all the pieces or blanks of dough onto the peel, by which they are then transferred to the oven for baking.

The advantages of my improved mold for making French rolls are that a large quantity can be formed at the same time, so that the waste of time incidental to the molding of the dough into individual rolls is dispensed with; secondly, that the pieces of dough required for the rolls can be cut into uniform size and shape by a quick cutting and trimming operation, and, lastly, that all the pieces of dough trimmed to the proper size can be simultaneously transferred to the peel and by the same into the oven, so that a considerable saving of time and labor results therefrom.

Having thus described my invention, I claim as new and desire to secure by Letters Patent—

1. A mold for making French rolls, which consists of a rectangular box, rows of raised ribs arranged in said box and separated by longitudinal intervals or spaces between said rows and the side walls of the box, aprons extending over said ribs and into the spaces between the ribs, and means for attaching said aprons to the ribs and end walls of the box, substantially as set forth.

2. A mold for making French rolls, consisting of a rectangular box provided with transverse cleats at its end walls, longitudinal rows of raised ribs rounded off at their upper ends arranged in said box and separated by longitudinal spaces from each other and the side walls of the box, aprons extending over the ribs and into the spaces between the same, and means for attaching said aprons to the upper ends of the ribs and the cleats at the end walls of the box, substantially as set forth.

In testimony that I claim the foregoing as my invention I have signed my name in presence of two subscribing witnesses.

BAPTISTE YCRE.

Witnesses:
 PAUL GOEPEL,
 ANAISE YCRE.